J. W. McKINNEY.
TROLLEY HARP.
APPLICATION FILED MAY 24, 1913.
1,098,456.
Patented June 2, 1914.
Fig. 1.
Fig. 2.
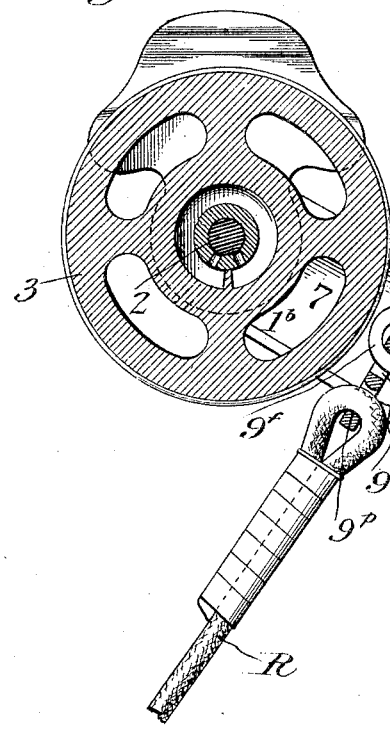
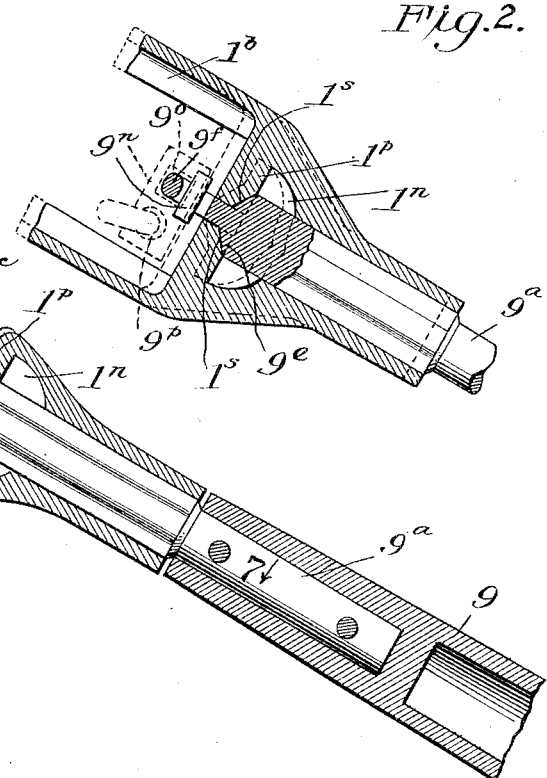
Witnesses
Fenton S. Belt
Donald U. Rich
Inventor
John W. McKinney
By Towell & Towell
Attorneys

UNITED STATES PATENT OFFICE.

JOHN W. McKINNEY, OF TYRONE, PENNSYLVANIA.

TROLLEY-HARP.

1,098,456.   Specification of Letters Patent.   Patented June 2, 1914.

Application filed May 24, 1913. Serial No. 769,635.

*To all whom it may concern:*

Be it known that I, JOHN W. MCKINNEY, of Tyrone, in the county of Blair and State of Pennsylvania, have invented certain new and useful Improvements in Trolley-Harps; and I hereby declare that the following is a full, clear, and exact description thereof, reference being had to the accompanying drawings, which form part of this specification.

This invention is an improvement in trolley harps for use on electric railways and provides a novel detachable connection between the harp and the trolley pole.

I will explain the invention in detail with reference to the accompanying drawings, and summarize in the claims the essential features and combinations of parts wherein the invention resides and for which protection is desired; but the invention is not restricted to the particular construction or proportions of parts shown in the drawings as these can be varied by the designer while embodying the essential novel features of the invention.

In said drawings—Figure 1 is a sectional elevation of the complete trolley head. Fig. 2 is a detail sectional view of the devices for attaching the harp to the pole.

In the drawings 1 designates a trolley harp, which is adapted to be attached to the trolley pole. The bifurcations $1^b$ of said harp support a shaft 2 on which the trolley wheel 3 is mounted. This wheel may be of any suitable construction.

The shank of the harp is preferably provided with an axial opening or socket which is enlarged at its upper end, as indicated at $1^n$, and above this enlargement is closed by a partition $1^p$, which has a narrow slot rectangular in cross section in it; and in the chamber $1^n$ at opposite sides of this slot are beveled shoulders $1^s$ (Fig. 2). Attached to the end of the pole 9 is a stud $9^a$ which is adapted to enter the socket in the harp and extend through the pocket $1^n$, said stud having a rectangular head $9^c$ on its upper end which is adapted to fit in the rectangular slot in the partition $1^p$, and slightly project therethrough; and beneath this head the shank is provided with beveled shoulders $9^e$ which are adapted to fit closely against the beveled shoulders $1^s$ in the shank, see Fig. 2, and form a close joint therewith; and when the harp is slipped onto the stud and positioned thereon, as indicated in Figs. 1 and 2, it will be seen that the harp cannot rotate on the pole but has a close fit thereon and will be securely held against rotatorial movement on the stud so long as the parts are engaged, as indicated in Fig. 2.

In order to detachably lock the harp to the stud I form head $9^c$ with a hook $9^f$ which is parallel with the head and is adapted to be engaged by a retainer $9^n$, consisting of a small metal plate, preferably rectangular in form, having an eye $9^o$ in one end which can be engaged with the hook $9^f$; and this retainer also has an eye $9^p$ which can be engaged by the guy rope R of the trolley. It will be seen that when the retainer is engaged with the hook the harp will be securely locked to the pole and it cannot be casually disengaged therefrom; and it is necessary, in order to engage or disengage the retainer from the hook, that the retainer be first turned to the position indicated in dotted lines in Fig. 2; *i. e.* at right angles to its normal position, and then turned to engage or disengage the hook $9^f$, and then when engaged with the hook, swung over to the position indicated in Fig. 1. In such position it cannot become casually disengaged from the hook, nor can it be forcibly disengaged from the hook unless it is first turned to the position indicated in dotted lines Fig. 2, and this position is one which necessitates manual handling of the retainer. By this means the harp is practically permanently secured to the pole, and yet can be easily disengaged therefrom if it is necessary to repair the harp or the wheel; and by having the harp detachable repairs of the harp or wheel can be made with much less trouble than if the harp is permanently attached to the pole. The retainer also provides a means of attachment of the guy rope R to the pole; and pull on the rope direct to the pole, instead of through the harp is transmitted, which is also a practical advantage.

What I claim is:

1. In combination, a trolley harp having a shank provided with a socket; a slot at the upper end of the socket; a stud adapted to fit in the socket and having a head on its end adapted to project through the slot, and means engaging the head to secure the stud to the socket.

2. In combination, a trolley harp having a shank provided with a socket, and a slot at the upper end of the socket; a stud adapted to fit in the socket and having a head on its end adapted to project through the slot, and a hook on the end of said head; with a retainer adapted to be detachably engaged with said hook to detachably secure the harp to the stud, substantially as described.

3. In combination, a trolley harp having a shank provided with a socket, a slot at the upper end of the socket, and beveled shoulders at the inner end of the slot; a stud adapted to fit in the socket and having beveled shoulders adapted to engage the beveled shoulders in the socket; a head adapted to project through the slot; and a hook on the end of said head; with a retainer adapted to be detachably engaged with said hook to secure the harp to the stud, substantially as described.

4. In combination, a trolley harp having a shank provided with a socket and a slot at the upper end of the socket, a stud adapted to engage the socket and having a hook on its end adapted to project through the slot, and a retainer adapted to detachably engage said hook to detachably secure the harp to the stud.

In testimony that I claim the foregoing as my own, I affix my signature in presence of two witnesses.

JOHN W. McKINNEY.

Witnesses:
 WM. W. LOWER,
 A. B. WOODRING.

Copies of this patent may be obtained for five cents each, by addressing the "Commissioner of Patents, Washington, D. C."